Jan. 17, 1956  J. E. SOCKE  2,731,137
CAN BODY CONVEYOR WITH ADJUSTABLE RAIL SUPPORTS
Filed Aug. 26, 1952
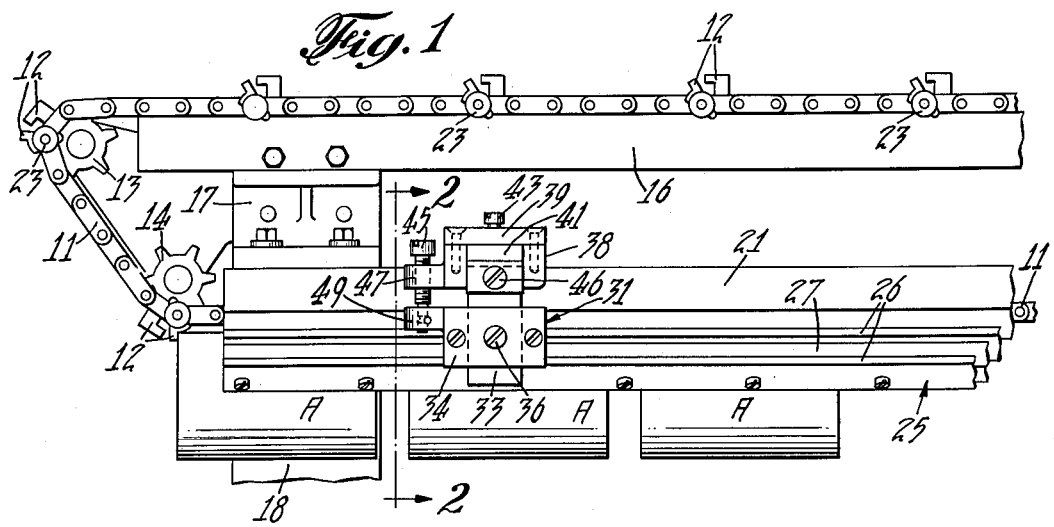
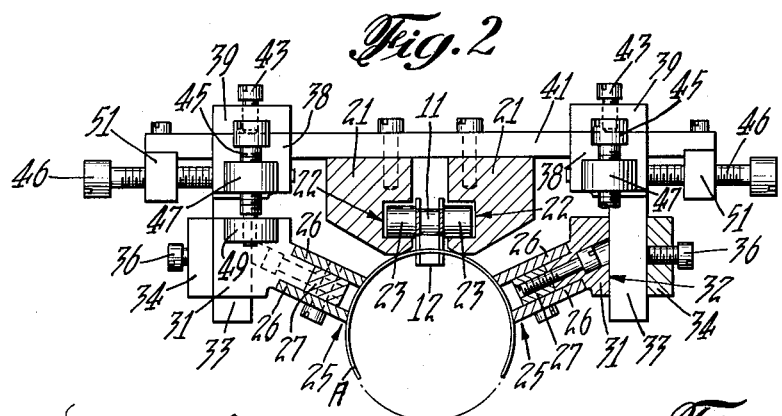
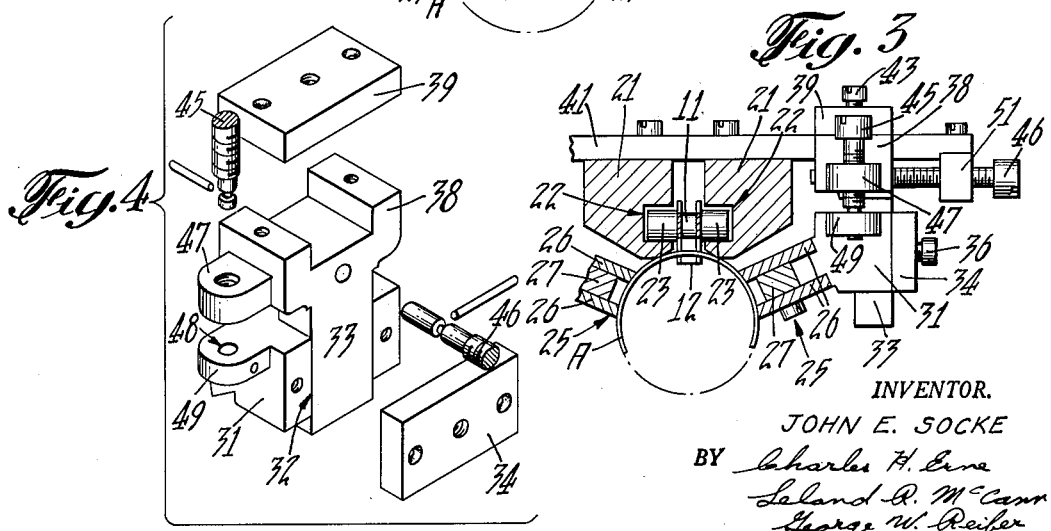
INVENTOR.
JOHN E. SOCKE under## United States Patent Office 2,731,137
Patented Jan. 17, 1956

2,731,137

CAN BODY CONVEYOR WITH ADJUSTABLE RAIL SUPPORTS

John E. Socke, Pelham Manor, N. Y., assignor to American Can Company, New York, N. Y., a corporation of New Jersey Application August 26, 1952, Serial No. 306,417

5 Claims. (Cl. 198—179)

The present invention relates to can body making machines having a horn for supporting can bodies advanced through the machine and has particular reference to devices for shifting movable members of the horn to accommodate can bodies of different sizes.

An object of the invention is the provision in a can body making machine of a multi-member horn for supporting can bodies wherein the members of the horn may be moved in two directions to accommodate can bodies of various diameters, so that the same machine may be used to produce can bodies of a multiplicity of sizes.

Numerous other objects and advantages of the invention will be apparent as it is better understood from the following description, which, taken in connection with the accompanying drawings, discloses a preferred embodiment thereof.

Referring to the drawings:

Figure 1 is a fragmentary side elevation of principal parts of a can body making machine embodying the instant invention;

Figs. 2 and 3 are enlarged transverse sectional views taken substantially along the line 2—2 in Fig. 1, with parts broken away, the two views showing the horn members in positions for two different diameter can bodies; and Fig. 4 is an enlarged exploded perspective view of certain of the support members shown in Figs. 1, 2 and 3.

As a preferred or exemplary embodiment of the invention the drawings illustrate principal parts of a can body side seam soldering machine of the character disclosed in United States Patent 1,338,716 issued May 4, 1920, to Magnus E. Widell on Soldering Machine. In such a machine the can bodies to be treated are propelled along a straight line path of travel in a substantially continuous procession and in end-to-end spaced and timed relation, the can bodies being supported in an outside horn or mandrel for the various operations performed on them.

In the instant invention cylindrical can bodies A are propelled along this straight line path of travel by an endless chain conveyor 11 (Figs. 1, 2 and 3) having conventional can body gripper dogs 12 secured thereto at spaced intervals along the chain for engagement behind each can body in the procession. The conveyor 11 operates over vertically spaced sprockets 13, 14 (Fig. 1) disposed at each end of the machine and is actuated in any suitable manner, preferably as shown in the above mentioned Widell patent.

The upper run of the conveyor 11, intermediate the ends of the machine, rides on and is supported by a stationary support bar 16 (Fig. 1) which is secured to brackets 17 which extend laterally from arms 18 forming a part of the main frame of the machine as shown in the Widell patent. The lower run of the conveyor 11 is disposed between a pair of depending spaced tracks 21 which are bolted to the brackets 17 as shown in Fig. 1. These tracks extend for nearly the entire length of the machine and are provided with opposed longitudinal grooves 22 for the reception of rollers 23 secured to both sides of the conveyor 11 adjacent the gripper dogs 12. The rollers 23 riding in these grooves 22 support the lower run of the conveyor 11 with the gripper dogs 12 depending below the tracks for propelling the can bodies A along their path of travel.

During this advancement of the can bodies A along their straight line path of travel they are supported preferably by a pair of spaced and parallel magnetic rail support units 25 which extend adjacent the tracks 21 for substantially their full length. Each of the rail support units 25 preferably comprises a pair of spaced and parallel permanent magnet pole plates 26 secured to opposite sides of a nonmagnetic core member 27 to provide a unitary structure. These units 25 are located one on each side of the lower run of the conveyor 11 adjacent the conveyor tracks 21 and are disposed at a predetermined angle so as to radially engage and hold in suspension, by magnetic attraction, the can bodies A being advanced therealong and therebetween by the conveyor 11.

In order to maintain this radial relation of the support rail units 25 for can bodies of any diameter, so that the same machine may be used for a number of different diameter can bodies, the units 25 are mounted in such a manner that they may be readily shifted vertically and horizontally to properly position the units for a particular diameter can body. For this purpose, each rail support unit 25 is secured to a vertically movable slide block 31 having a preferably rectangular shaped vertical groove 32.

The slide block 31 extends around three sides of a depending rectangular shaped shank 33 on which the block is slidably mounted. A flat retainer plate or cap 34 disposed adjacent the fourth side of the shank 33 and having its ends secured to the slide block 31 as best shown in Fig. 1, holds the block against lateral displacement from the shank and provides for easy vertical sliding movement of the block on the shank. A set screw 36 threadedly secured in the plate and extending through the plate with its inner end in engagement with the slide shank 33 is provided for tightly locking the slide block 31 in an adjusted vertical position on the shank. There preferably is a plurality of these slide blocks 31 and the slide shanks 33 for each magnetic rail support unit 25, spaced at intervals along each unit.

The upper end of each slide shank 33 is formed with a rectangular shaped horizontal slide bearing 38 (Fig. 4) having a cap or retainer plate 39 secured thereto which provides a closed bearing for a stationary horizontal slide bar 41 which extends transversely of and which is secured to the top faces of the conveyor tracks 21 (see Fig. 2). The bearing 38 is readily slidable on the slide bar 41 to shift the vertical depending slide shank 33 and the magnetic rail support unit 25 carried thereon in a horizontal direction normal to the path of can travel. A locking screw 43 threadedly engaged in the bearing cap 39 and extending through the cap with its inner end in engagement with the slide bar 41 is provided for tightly locking the slide bearings 38 and slide shank 33 in a horizontally adjusted position.

Thus by loosening the locking screws 36, 43 in the caps 34, 39 of the vertically and horizontally movable slide block 31 and the slide bearing 38 respectively, the magnetic rail support units 25 may readily be shifted horizontally and vertically into any desired position to accommodate a desired diameter size can body and thereafter tightening said screws to maintain the units in the desired radial relation to the body.

In order to provide for accurate micrometer adjustment of the can body rail support units 25, rotatable adjusting screws 45, 46 are provided for the vertical slide block 31 and the horizontal slide bearing 38 respectively.

The vertical slide block adjusting screw 45 is threadedly engaged in and extends through a lug 47 which extends out from the slide bearing 38 (see Fig. 4). The lower end of this adjusting screw 45 is provided with a reduced diameter, smooth shaft section having an annular groove and is rotatably secured by a pin in a smooth bore 48 (Fig. 4) in a lug 49 which extends out from the vertical slide block 31. Hence the slide block 31 is connected to the slide bearing 38 through the adjusting screw 45 and when the screw is rotated, the vertical slide block 31 slides vertically on the slide shank 33. Thus the vertical position of the slide block 31 on the shank 33 may be accurately effected within close tolerances to properly locate the rail support unit 25 carried thereby, for a particular diameter size can body.

In like manner the horizontal position of the rail support unit 25 is effected accurately by the adjusting screw 46. This adjusting screw 46 is threadedly engaged in and extends through a depending lug 51 attached to the outer end of the transversely disposed horizontal slide bar 41. The inner end of the screw is formed with a reduced diameter and grooved shaft section similar to that of the adjusting screw 45 and is rotatably secured by a pin in the slide bearing 38. Hence the slide bearing 38 is connected to the slide bar 41 through the adjusting screw 46 and when the screw 46 is rotated, the slide bearing 38 slides along the slide bar 41 in a horizontal direction. The depending shank 33 and the can body rail support unit 25 carried thereon move with the slide bearing 38 and thus the unit 25 may be accurately located horizontally and within equally close tolerances, for a particular diameter size can body.

Thus through the accurate combined horizontal and vertical adjusting movements of the rail support units 25, the machine may be set for can bodies of any particular diameter, while thereafter maintaining said units in their proper and most efficient radial relation to the can bodies.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a can body making machine, the combination of an elongated track having a conveyor thereon for advancing the can bodies longitudinally of the machine, a slide bar supported by said track and extending transversely thereof, a pair of bearing members supported by said bar on opposite sides of said track for horizontal sliding movement on said bar, each bearing member having a depending shank thereon, a block member movably carried by each of said shanks for vertical sliding movement thereon, a pair of spaced rail members extending longitudinally of the machine on opposite sides of said conveyor, said rail members being respectively carried by said block members in inclined relation thereto for movably supporting the advancing can bodies with a minimum of friction in radial relation to the can body axes, means for locking said block members in vertically adjusted position on said depending bearing member shanks, and means for locking said bearing members in horizontally adjusted position on said slide bar, whereby the positions of said can body supporting rail members may be varied at will on opposite sides of said track so as to accommodate therebetween can bodies of different diameters while maintaining the desirable radially extending relation between said rail members and the can body axes.

2. The combination defined in claim 1, wherein adjusting screws are movably disposed between said slide bar and said bearing members respectively and other adjusting screws are movably disposed respectively between said bearing members and said block members, whereby to obtain a micrometer adjustment of said rail members in both vertical and horizontal directions for a can body of a given size.

3. In a can body making machine, the combination of a plurality of magnetic rails for engaging spaced portions of can bodies to support the same with a minimum of friction, means for advancing the can bodies between and longitudinally along said rails, a plurality of vertically movable slide blocks respectively connected with and supporting said rails in downwardly inclined relation thereto, a plurality of vertically disposed slide shanks for respectively supporting and guiding said slide blocks for vertical sliding movement therealong, a horizontal slide bearing on each of said shanks, a horizontally disposed slide bar engaging and supporting said slide bearings for horizontal sliding movement therealong, means for clamping said slide blocks in vertically adjusted position on said shanks and means for clamping said slide bearings in horizontally adjusted position on said bar, whereby said slide blocks may be shifted vertically on said slide bearing shanks and said slide bearings may be shifted horizontally with said slide blocks on said bar and thereafter clamped in adjusted position, thereby relatively moving said magnetic rails vertically and horizontally for the accommodation therebetween of can bodies of varying diameter sizes while maintaining said rails in opposed radial relation to the axes of said can bodies.

4. In a can body making machine, the combination of a plurality of spaced magnetic rails for attracting and supporting can bodies being advanced therebetween in end to end relation in a substantially continuous procession, means for advancing the can bodies between in end to end relation in a substantially continuous procession, means for advancing the can bodies between and longitudinally of said rails, a vertically movable slide block connected with and supporting each of said rails in downwardly inclined relation thereto, a vertically disposed slide shank slidably supporting and guiding each of said slide blocks, a horizontal slide bearing on each of said shanks, and a transversely disposed horizontal slide bar engaging and supporting said slide bearings, whereby said slide blocks and said slide bearings may be respectively shifted vertically and horizontally on said shanks and slide bar respectively to correspondingly move said rails relative to each other for the accommodation therebetween of can bodies of varying diameters while maintaining said rails in radial relation to the axes of said can bodies, and a locking screw on each of said slide blocks and slide bearings, said locking screws respectively engaging said shanks and slide bar for locking said rails in vertically and horizontally adjusted position.

5. In a can body making machine, the combination of a plurality of magnetic rail members for engaging opposed peripheral portions of can bodies to support said bodies with a minimum of friction while the bodies are advanced in contact therewith, means for advancing the can bodies between and longitudinally along said rails in endwise relation and in a substantially continuous procession, a vertically movable slide block connected with and supporting each of said rails in downwardly inclined relation thereto, a vertically disposed slide shank for supporting and guiding each of said slide blocks for vertical sliding movement thereon, a horizontal slide bearing on each of said shanks, a horizontally disposed slide bar engaging and supporting said slide bearings for horizontal sliding movement thereon, whereby said slide blocks and said slide bearings may be respectively shifted vertically and horizontally on said shanks and slide bar to correspondingly move said rails relative to each other for the accommodation therebetween of can bodies of different diameters while maintaining said rails in radial relation to the axes of said can bodies, a micrometer adjusting screw disposed between each of said slide blocks and slide bearings for accurately vertically shifting said slide blocks on said slide bearing shanks, and a micrometer adjusting screw disposed between each of said slide bearings and said slide bar for accurately horizontally shifting said slide bearings relative to said slide bar, whereby to obtain a precision adjustment of said rails in contiguous radially disposed relation to the axis of a can body of predetermined size.

References Cited in the file of this patent

UNITED STATES PATENTS

| | | |
|---|---|---|
| 1,303,061 | Brown | Aug. 12, 1919 |
| 1,534,677 | Assmann | Apr. 21, 1925 |
| 1,670,253 | Gilbert | May 15, 1928 |
| 2,491,616 | Laxo | Dec. 20, 1949 |
| 2,660,969 | Woolford | Dec. 1, 1953 |

FOREIGN PATENTS

| | | |
|---|---|---|
| 458,758 | Canada | Aug. 9, 1949 |